No. 776,744. PATENTED DEC. 6, 1904.
J. KANE.
ORE CONCENTRATOR BELT.
APPLICATION FILED APR. 2, 1904.
NO MODEL.

Witnesses:
Inventor
John Kane
by Gifford & Bull Attys.

No. 776,744. Patented December 6, 1904.

UNITED STATES PATENT OFFICE.

JOHN KANE, OF PASSAIC, NEW JERSEY, ASSIGNOR TO THE MANHATTAN RUBBER MFG. CO., A CORPORATION OF NEW JERSEY.

ORE-CONCENTRATOR BELT.

SPECIFICATION forming part of Letters Patent No. 776,744, dated December 6, 1904.

Application filed April 2, 1904. Serial No. 201,272. (No model.)

*To all whom it may concern:*

Be it known that I, JOHN KANE, a citizen of the United States, and a resident of Passaic, county of Passaic, and State of New Jersey, have invented a new and useful Improvement in Ore-Concentrator Belts, of which the following is a specification.

Ore-concentrator belts are usually made of rubber or canvas, or both, in endless form and in use are supported by rollers around which they move. Such belts are usually provided with side flanges extending approximately at right angles to the surface of the belt, the purpose of which is to confine the material being treated on the belt. At the points where the belt passes around the supporting-rollers these flanges are subjected to a stretching strain, which is very destructive to them, and to provide against which various devices or forms of flange have been proposed.

I have discovered that by corrugating the upper edge of the flanges they are enabled to stand the strain above referred to without destruction.

Figure 1:
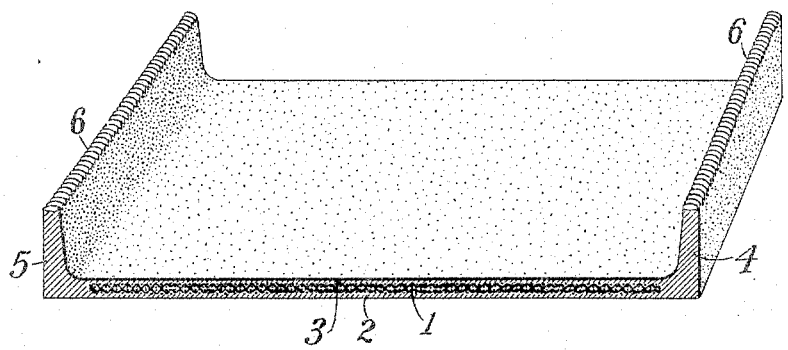
Figure 2:
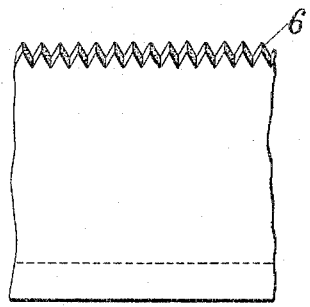

In the accompanying drawings, Figure 1 is a perspective view of a section cut from an endless belt containing my invention. Fig. 2 is a side view of the same.

The body or floor of the belt consists of the canvas 1, coated by the rubber 2 3. 4 and 5 are the side flanges composed of rubber compounds which when vulcanized are substantially integral with the coatings 2 and 3, but of softer composition, so that the flanges are more pliable and elastic than is the body or floor of the belt. The upper edge of each flange is corrugated, as at 6, so that when the flange passes around a supporting-roller the consequent lengthening or stretching of the upper edge of the flange instead of splitting or breaking the edge has a tendency to straighten the corrugations, and thereby prevent the destruction of the flange.

It will be observed that the corrugations of the edge of the flange are substantially parallel with the surface of the belt, being therefore distinct both in construction and mode of operation from any belt in which the flanges are corrugated at right angles to the surface of the belt.

Having thus described my invention, I claim as new and desire to secure by Letters Patent—

A belt for ore-concentrators having continuous side flanges of vulcanized rubber surmounted by integral transverse upwardly-extending edge projections.

In testimony whereof I have hereunto signed my name in the presence of two subscribing witnesses.

JOHN KANE.

Witnesses:
R. F. GASTON,
ALEX. HENDERSON.